(12) United States Patent
Zheng et al.

(10) Patent No.: US 12,508,099 B2
(45) Date of Patent: Dec. 30, 2025

(54) MICROSCOPE TUBE

(71) Applicant: CARL ZEISS MICROSCOPY GMBH, Jena (DE)

(72) Inventors: Haiyan Zheng, Shanghai (CN); Xiangxiang Zhang, Shanghai (CN)

(73) Assignee: CARL ZEISS MICROSCOPY GMBH, Jena (DE)

( * ) Notice: Subject to any disclaimer, the term of this patent is extended or adjusted under 35 U.S.C. 154(b) by 435 days.

(21) Appl. No.: 18/307,427

(22) Filed: Apr. 26, 2023

(65) Prior Publication Data

US 2023/0346502 A1 Nov. 2, 2023

(30) Foreign Application Priority Data

Apr. 28, 2022 (CN) .......................... 202210469148.4

(51) Int. Cl.
*A61B 90/20* (2016.01)
*G02B 21/00* (2006.01)
*G02B 21/04* (2006.01)

(52) U.S. Cl.
CPC .............. *A61B 90/20* (2016.02); *G02B 21/00* (2013.01); *G02B 21/04* (2013.01)

(58) Field of Classification Search
CPC .... G02B 21/00; G02B 21/04; G02B 26/0816; A61B 90/20
See application file for complete search history.

(56) References Cited

U.S. PATENT DOCUMENTS

| | | | | |
|---|---|---|---|---|
| 7,554,724 B2* | 6/2009 | Hasegawa | ............ | G02B 21/361 359/384 |
| 2004/0141231 A1* | 7/2004 | Hund | .................. | G02B 25/001 359/368 |
| 2004/0190128 A1* | 9/2004 | Hund | .................. | G02B 21/361 359/368 |
| 2005/0105175 A1* | 5/2005 | Winterot | .............. | G02B 21/361 359/384 |

* cited by examiner

*Primary Examiner* — Alexander P Gross
(74) *Attorney, Agent, or Firm* — Armstrong Teasdale LLP (57) ABSTRACT

The present disclosure is directed to a microscope tube including a ocular optical path including a collecting lens, a deflecting optical system, a binocular unit and an eyepiece, wherein light emitted from an objective enters through the collecting lens and is transmitted into the binocular unit via the deflecting optical system to allow a human eye to observe by the eyepiece at a visual angle, wherein the deflecting optical system includes a fixed deflecting optical components group and a rotatable deflecting optical components group located after the fixed deflecting optical components group along a light transmission path, the visual angle being adjustable by the rotatable deflecting optical components group, and light emitted from the objective reaching the binocular unit after an even number of reflections of at least four times by the deflecting optical system.

27 Claims, 4 Drawing Sheets

MICROSCOPE TUBE

CROSS REFERENCE TO RELATED APPLICATIONS

This patent application claims the benefit and priority of Chinese Patent Application No. 202210469148.4 filed on Apr. 28, 2022, the disclosure of which is incorporated by reference herein in its entirety as part of the present application.

BACKGROUND

The present disclosure relates to a microscope tube, and more particularly, to a microscope tube that can adjust a visual angle, i.e., an angle of an optical path axis in a binocular unit with respect to the horizontal line.

As is known, a microscope is an optical instrument that exhibits a microscopic world to human beings. The microscope is classified into, for example, an optical microscope, a surgical microscope, an X-ray microscope, a scanning electron microscope, a confocal microscope, a super resolution fluorescence microscope, etc., according to its application fields and optical principles.

In conventional visually observable microscopes, the microscope lens barrel is positioned at a fixed angle, and the visual angle and height thereof are thus not suitable for all observers. It should be appreciated that the microscope is considered as ergonomic if the observer's eyes can view the microscope in a nearly horizontal direction. This is because the observer would not feel so tired even for a long period of time for the microscopic observation when he/she views the eyepiece in a direction lower or slightly higher than the horizontal. Some microscope users need to use the microscope for a long period of time (up to several hours) every day, and in order to ensure a comfortable working posture, it is necessary for the instrument to have its own ergonomic characteristics. Since different people have different requirements for the comfortable visual angle, a microscope tube with an adjustable visual angle is needed to meet ergonomic requirements of different users so that the users can find a comfortable visual angle by properly adjusting the inclination angle of the binocular unit.

However, due to the great variations in height of microscope users, the known tubes that can adjust the visual angle has a minimum angle greater than 0 degrees, especially in the case where some microscope stands are tall, which makes people with short height uncomfortable to use.

BRIEF DESCRIPTION

The present disclosure is thus proposed and aims to provide a microscope tube that can adjust the visual angle so that the above and other disadvantages of the prior art can be overcome.

The present disclosure provides a microscope tube including a ocular optical path including a collecting lens, a deflecting optical system, a binocular unit and an eyepiece, wherein light emitted from an objective enters through the collecting lens and is transmitted into the binocular unit via the deflecting optical system to allow a human eye to observe by the eyepiece at a visual angle, which is determined as an angle of an optical path axis in the binocular unit with respect to a horizontal line, wherein the deflecting optical system includes a fixed deflecting optical components group and a rotatable deflecting optical components group located after the fixed deflecting optical components group along a light transmission path, the visual angle being adjustable by the rotatable deflecting optical components group, light emitted from the objective reaching the binocular unit after an even number of reflections of at least four times by the deflecting optical system, including successively at least a first reflection and a second reflection occurring in the fixed deflecting optical components group, and a third reflection and a fourth reflection occurring in the rotatable deflecting optical components group, wherein the third reflection point is the highest in a vertical direction as compared to the first reflection point, the second reflection point and the fourth reflection point.

The microscope tube according to the present disclosure can not only realize a large adjustment range of the visual angle (the minimum visual angle that can be realized is less than 0 degrees). In addition, with a proper optical path design, a compact and space-consuming microscope tube system can also be obtained.

BRIEF DESCRIPTION OF THE DRAWINGS

The above and other features and advantages of the disclosure will become more apparent from the following detailed description with reference to the annexed drawings in which.

DETAILED DESCRIPTION

A microscope tube according to embodiment(s) of the disclosure is described below with reference to the accompanying drawings. In the following description, numerous specific details are set forth to allow those skilled in the art to have a more thorough understanding of the present disclosure. It will be apparent, however, to those skilled in the art, that the disclosure may be practiced without some of these specific details.

Furthermore, it is to be understood that the disclosure is not limited to the particular embodiments described. Rather, the disclosure may be practiced with any combination of the following features and elements, whether or not they refer to different embodiments. Thus, the following aspects, features, embodiments, and advantages are for illustration purposes only and should not be construed as an element or a limitation of the claims unless expressly recited in a claim. In the following description, elements of the present application are described using terms such as "first", "second", etc., which are used merely to distinguish one element from another without limiting the nature, sequence, order, or number of such elements. Additionally, it should be noted that throughout the description, identical and/or functionally identical technical features may be referred to by the same or similar reference numerals.

The present disclosure provides a microscope tube which can adjust a visual angle, including an ocular optical path, which includes a collecting lens, a deflecting optical system, a binocular unit and an eyepiece, wherein light emitted from an objective enters through the collecting lens and is transmitted into the binocular unit via the deflecting optical system to allow a human eye to observe via the eyepiece at a visual angle, which is determined as an angle of an optical path axis OA1 in the binocular unit with respect to a horizontal line. The deflecting optical system includes a stable or fixed deflecting optical components group and a rotatable deflecting optical components group located after the fixed deflecting optical components group along a light transmission path, the rotatable deflecting optical components group including a rotatable mirror and/or a rotatable prism, such that adjustment of the visual angle can be achieved by rotationally adjusting the rotatable deflecting optical components group.

According to the present disclosure, light emitted from the objective reaches the binocular unit after an even number of reflections of at least four times by the deflecting optical system. For example, in various exemplary embodiments as will be explained in detail below, light emitted from the objective is subjected to four reflections by the deflecting optical system, which successively include a first reflection and a second reflection occurring in the fixed deflecting optical components group and a third reflection and a fourth reflection occurring in the rotatable deflecting optical components group. It is to be noted that the deflecting optical system can be arranged such that, in the vertical direction, the first reflection point, the second reflection point, and the third reflection point are all higher than the fourth reflection point and the third reflection point is the highest. In this way, light emitted from the objective enters the binocular unit after four reflections along the above-mentioned path by the deflecting optical system, so that a wide adjustment range of the visual angle of the ocular optical path is achieved (with a minimum angle of less than 0°), and a more compact microscope tube system can be achieved.

Figure 1:
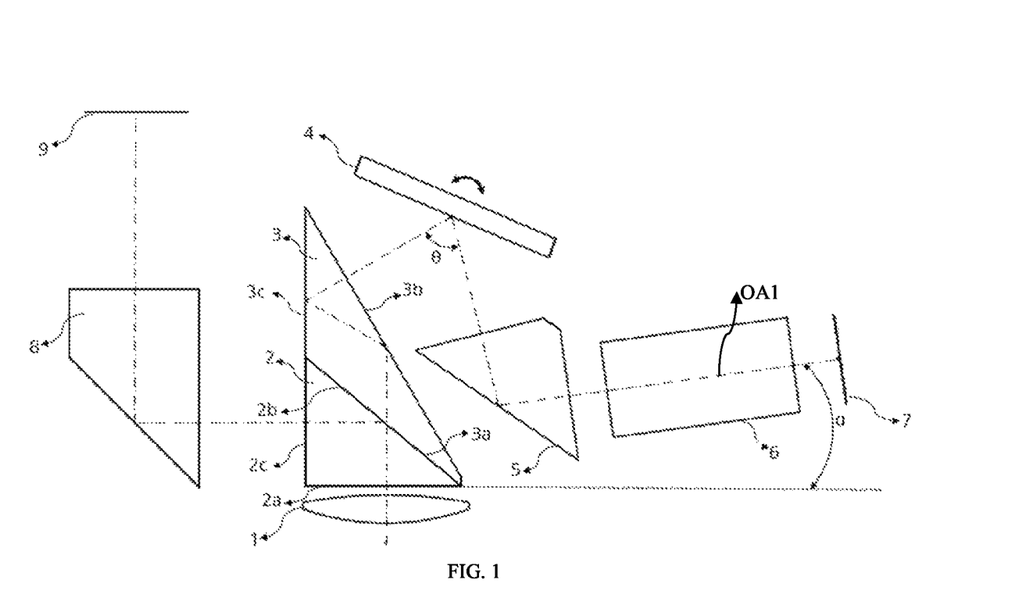
FIG. 1 shows a schematic diagram of optical path in an optical system of a microscope tube with a camera detection optical path according to a first embodiment of the disclosure.

FIG. 1 shows a schematic diagram of an optical path in an optical system of a microscope tube with a camera detection optical path according to a first embodiment of the present disclosure, wherein a fixed deflecting optical components group includes a 45 degree right angle prism and a quadrilateral prism, which are bonded at a slant plane of the 45 degree right angle prism. A rotatable deflecting optical components group includes a rotatable mirror and an isosceles prism fixed in position with respect to the mirror and enabling one total internal reflection. In the embodiment as shown in FIG. 1, when the mirror 4 is rotated, the isosceles prism 5 is also moved together with the mirror 4 (i.e., rotated around the center of rotation of the mirror 4) to ensure that the relative position and angle between the isosceles prism 5 and the light reflected by the mirror 4 are kept constant, but the isosceles prism 5 itself is not rotated. For example, in this embodiment, it is ensured that the distance between the incident plane of the isosceles prism 5 and the center of rotation of the mirror 4 is constant, the incident plane of the isosceles prism 5 receives at 90 degrees the light reflected by the mirror 4 at all times, and the radiated position and area of the light on the incident plane of the isosceles prism 5 is constant.

Specifically, the microscope tube according to the first embodiment of the present disclosure includes an ocular optical path and a camera detection optical path. In this first embodiment, the ocular optical path includes a collecting lens 1, the 45 degree right angle prism 2, the quadrilateral prism 3, the rotationally adjustable mirror 4, the isosceles prism 5, the binocular unit 6 (on which the eyepiece is mounted), and the human eye 7. The camera detection optical path includes the collecting lens 1, the 45 degree right angle prism 2, the 45 degree right angle trapezoidal prism 8, and a detect imaging plane 9.

In the ocular optical path, light emitted from the objective passes through the collecting lens 1 and a horizontal receiving plane 2a of the 45 degree right angle prism 2 and is incident on a slant plane 2b of the 45 degree right angle prism 2. Since the slant plane is coated with a beam splitting film, the light incident on the slant plane 2b is split into a first light portion transmitted through the slant plane and a second light portion reflected at the slant plane, wherein the first light portion passes through the slant plane 2b (also as a first face 3a of the quadrilateral prism 3) to a second face 3b of the quadrilateral prism 3 and is reflected at the second face 3b to a third face 3c, which reflects the light back to the second face 3b. The light exits through the second face 3b to the mirror 4, which reflects the light into the isosceles prism 5, and thereafter the light is totally reflected inside the isosceles prism 5 and emitted to the binocular unit 6 and the human eye 7.

In the camera detection optical path, light emitted from the objective passes through the collecting lens 1 and the receiving plane 2a of the 45 degree right angle prism 2 and is incident on the slant plane 2b of the 45 degree right angle prism 2, wherein the second light portion reflected at the slant plane 2b is reflected to an exit plane 2c through which the light is transmitted to the 45 degree right angle trapezoidal prism 8. Then, the light enters into the detect imaging plane 9 with one total reflection inside the 45 degree right angle trapezoidal prism 8, thereby allowing detection of an object to be detected by means of an imaging device such as a camera.

The visual angle α is determined by the rotatable deflecting optical components group consisting of the mirror 4 and the isosceles prism 5. In this first embodiment, adjustment of the visual angle α can be fulfilled by rotating the mirror 4. The variation of the incident-exit beam angle θ (i.e., the angle formed between the incident beam and the exit beam on the mirror 4) is twice the rotation angle of the mirror 4, that is, if the mirror 4 is rotated by an angle a, the incident-exit beam angle on the mirror 4 is θ±2a (where 2a is the variation in the incident-exit beam angle). Also, the variation of the visual angle α is twice the rotation angle of the mirror 4, that is, if the mirror 4 is rotated by an angle a, the visual angle is α±2a (where 2a is the variation in the visual angle). It should be understood that, in this embodiment, the adjustment range of the visual angle α is from −2° to 30°.

Since the minimum angle of the visual angle is less than 0°, which allows the microscope user to observe by the eyepiece in a direction slightly lower than the horizontal direction, the user does not feel so tired even for a long period of time for the microscopic observation. Therefore, the microscope tube according to the embodiments of the present disclosure is ergonomic.

In the embodiment shown in FIG. 1, only the collecting lens 1 includes lens(es) and is located at the forefront of all prisms, so that when the ocular optical path has been designed, the camera detection optical path does not need to be redesigned, but only the deflecting manner of the prisms or mirrors needs to be changed.

In this embodiment, the isosceles prism 5 in the ocular optical path can be replaced with any plane mirror or prism enabling one total internal reflection if the configuration allows. The quadrilateral prism 3 can be replaced with any other prism enabling two times of total internal reflection, such as a triangular prism, etc. In addition, the 45 degree right angle trapezoidal prism 8 in the camera detection optical path can be replaced with any plane mirror or prism enabling one total internal reflection if the configuration allows.

Figure 2:
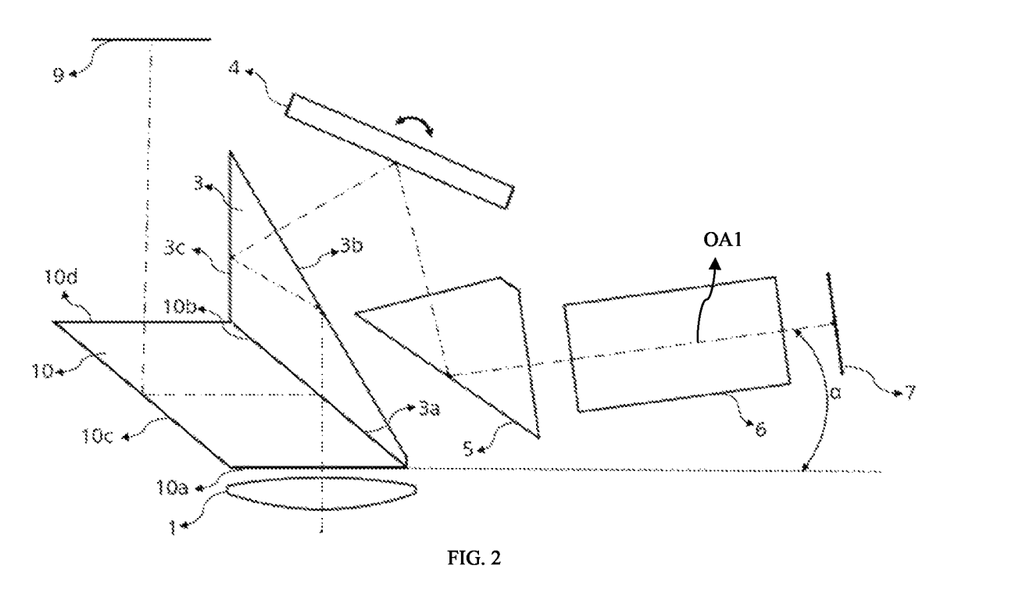
FIG. 2 shows a schematic diagram of optical path in an optical system of a microscope tube with a camera detection optical path according to a second embodiment of the disclosure.

Continuing with FIG. 2, it shows a schematic diagram of optical path in an optical system of a microscope tube with a camera detection optical path according to a second embodiment of the present disclosure, wherein a fixed deflecting optical components group includes a 45 degree rhombic prism and a quadrilateral prism, which are bonded to each other at a first slant plane of the 45 degree rhombic prism. A rotatable deflecting optical components group includes a rotatable mirror and an isosceles prism enabling one total internal reflection, which is fixed in position with respect to the mirror.

Specifically, the microscope tube according to the second embodiment of the present disclosure includes the ocular optical path and the camera detection optical path. In comparison with the above-described first embodiment, in this second embodiment, the ocular optical path remains unchanged, while only two reflections in the camera detection optical path realized by the combination of the 45 degree right angle prism 2 and the 45 degree right angle trapezoidal prism 8 are realized instead by the 45 degree rhombic prism 10.

In the camera detection optical path of this embodiment, light emitted from the objective passes through the collecting lens 1 and a first plane 10a of the 45 degree rhombic prism 10 and is incident on a first slant plane 10b of the 45 degree rhombic prism 10. Since the first slant plane 10b is coated with a beam splitting film, the light incident on the first slant plane 10b is split into a first light portion transmitted through the first slant plane and a second light portion reflected at the first slant plane 10b. The second light portion is reflected by the first slant plane 10b to a second slant plane 10c of the 45 degree rhombic prism 10, and the light is totally reflected by the second slant plane 10c and passes through the second plane 10d to finally reach the detect imaging plane 9. In addition, the first light portion transmitted through the first slant plane 10b is finally transmitted into the binocular unit 6 and the human eye 7 along a similar light transmission path as in the first embodiment.

Figure 3:
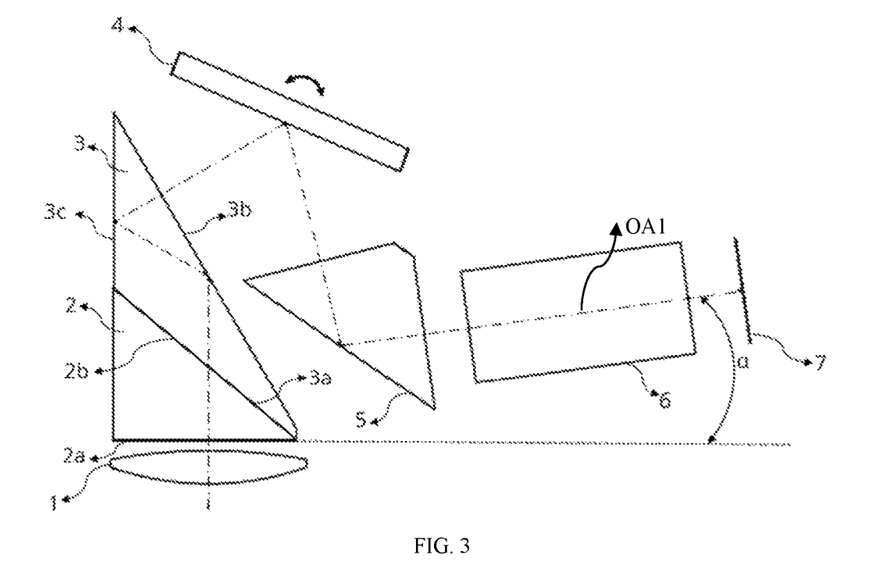
FIG. 3 is a schematic diagram showing only the ocular optical path of the microscope tube in FIG. 1.

FIG. 3 is a schematic diagram showing the optical path of only the ocular optical path of the microscope tube in FIG. 1, and FIGS. 4A, 4B, 4C, and 4D show various alternative ocular optical paths modified based on the ocular optical path shown in FIG. 3.

Figure 4A:
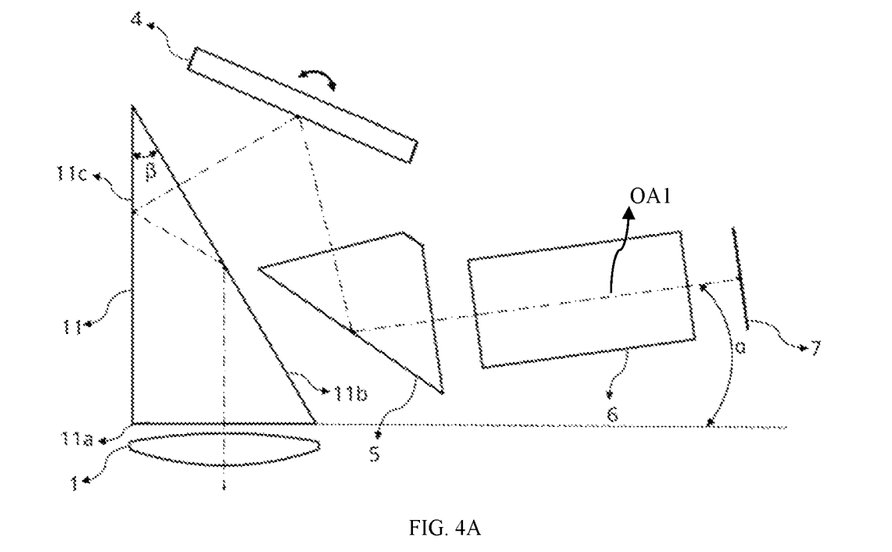
FIG. 4A is a schematic diagram showing the ocular optical path of the microscope tube according to a third embodiment of the present disclosure, which is modified based on the optical path shown in FIG. 3.

As shown in FIG. 4A, on the basis of the ocular optical path shown in FIG. 3, the 45 degree right angle prism 2 and the quadrilateral prism 3 are replaced by a 30 degree right angle prism 11 which is disposed such that its short straight side faces the collecting lens 1 to serve as a horizontal receiving plane for light transmitted through the collecting lens 1.

Specifically, in the ocular optical path, light emitted from the objective passes through the collecting lens 1 and a first face 11a (as the horizontal receiving plane) of the 30 degree right angle prism 11 and is incident on a second face 11b of the 30 degree right angle prism, and is then reflected by the second face 11b to a third face 11c. The light is reflected by the third face 11c back to the second face 11b, exits through the second face 11b to the mirror 4, and is then reflected by the mirror 4 to the isosceles prism 5, and is totally reflected inside the isosceles prism 5 into the binocular unit 6 and the human eye 7.

It should be understood that the 30 degree right angle prism 11 in this embodiment can be any prism that can achieve two times of total internal reflection, where the minimum angle $\beta$ is 30°. Other angles are possible, but the minimum angle $\beta$ must be less than 45° to achieve two times of total internal reflection, and the other acute angle is twice the minimum angle $\beta$.

Figure 4B:
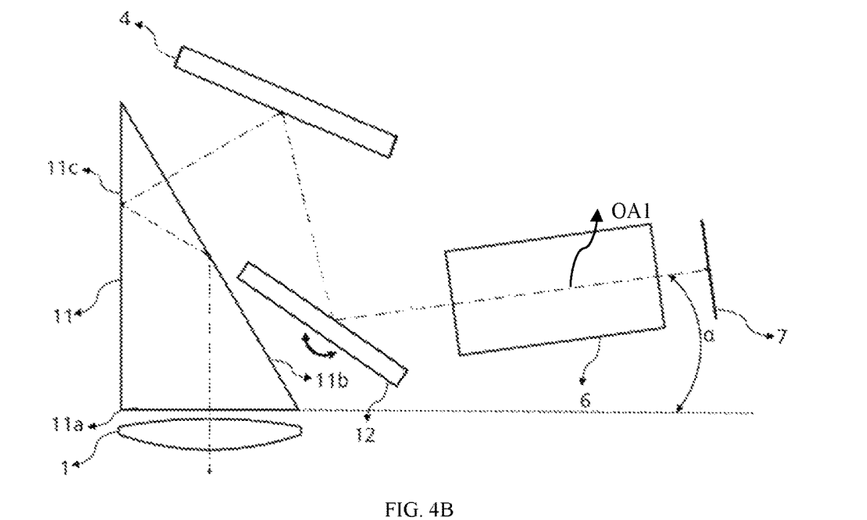
FIG. 4B is a schematic diagram showing the ocular optical path of the microscope tube mirror according to a fourth embodiment of the present disclosure, which is modified based on the optical paths shown in FIGS. 3 and 4A.

As shown in FIG. 4B, the mirror 4 is fixed in position and the isosceles prism 5 is replaced with a mirror 12 based on the ocular optical paths shown in FIGS. 3 and 4A. Different from the embodiments shown in FIGS. 3 and 4A, in the embodiment shown in FIG. 4B, the mirror 4 is completely fixed and only the mirror 12 can rotate. Here, the modification to the visual angle $\alpha$ is realized by the rotation of the mirror 12. Any prism enabling one total internal reflection can be substituted for the mirror 4 as the configuration allows. The mirror 12 determines the visual angle $\alpha$, and in this embodiment, adjustment of visual angle $\alpha$ is realized by rotating the mirror 12. The variation of the incident-exit beam angle $\theta$ on the mirror 12 is twice the rotation angle of the mirror 12, that is, if the mirror 12 is rotated by an angle a, the incident-exit beam angle on the mirror 12 is $\theta \pm 2a$ (where 2a is the variation in the incident-exit beam angle). Also, the variation of the visual angle $\alpha$ is twice the rotation angle of the mirror 12, that is, if the mirror 12 is rotated by an angle a, the visual angle is $\alpha \pm 2a$ (where 2a is the variation in the visual angle).

Figure 4C:
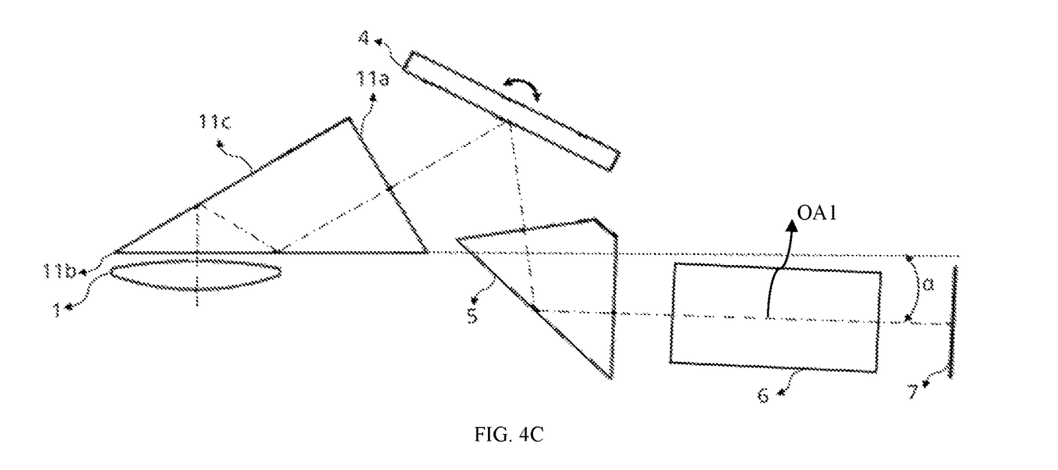
FIG. 4C is a schematic diagram showing the ocular optical path of the microscope tube according to a fifth embodiment of the present disclosure, which is modified based on the optical paths shown in FIGS. 3 and 4A.

As shown in FIG. 4C, based on the ocular optical paths shown in FIGS. 3 and 4A, the 30 degree right angle prism 11 is disposed at another angle such that its hypotenuse or slant plane faces the collecting lens 1 to serve as the horizontal receiving plane for light transmitted through the collecting lens 1.

Specifically, in the ocular optical path, light emitted from the objective passes through the collecting lens 1 and the second face 11b of the 30 degree right angle prism 11 and is incident on the third face 11c of the 30 degree right angle prism, and is reflected by the third face 11c to the second face 11b. The second face 11b reflects the light again to the first face 11a, and the light exits through the first face 11a to the mirror 4. The light is then reflected by the mirror 4 into the isosceles prism 5, and is totally reflected inside the isosceles prism 5 to the binocular unit 6 and the human eye 7.

Figure 4D:
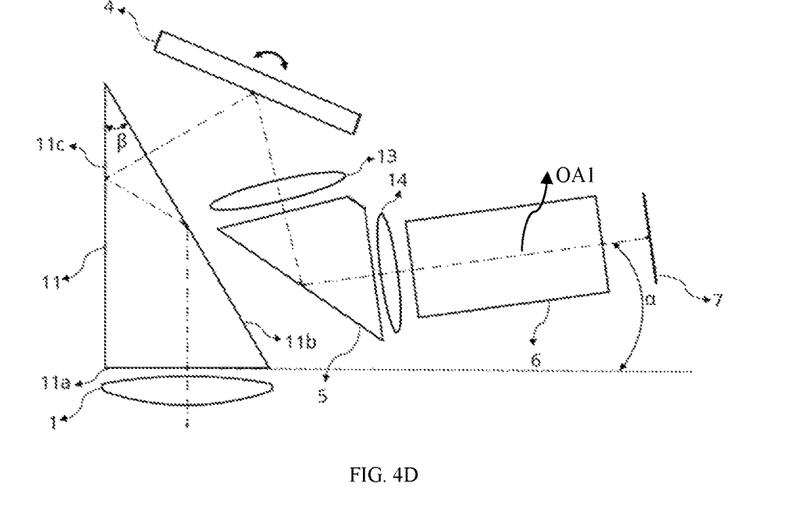
FIG. 4D is a schematic diagram of optical path in an optical system of the microscope tube of FIG. 4A with a plurality of lens groups being added.

As shown in FIG. 4D, based on the ocular optical path shown in FIG. 4A, a first lens group 13 and a second lens group 14 are inserted according to the optical imaging requirements. The light emitted from the objective passes through the collecting lens 1 and the first face 11a of the 30 degree right angle prism 11, and is incident on the second face 11b of the 30 degree right angle prism, and is reflected by the second face 11b to the third face 11c. The light is then reflected by the third face 11c back to the second face 11b and exits through the second face 11b to the mirror 4. Then, the light is reflected by the mirror 4 and passes through the first lens group 13 into the isosceles prism 5, and is totally reflected inside the isosceles prism 5, and passes through the second lens group 14 to the binocular unit 6 and the human eye 7. It should be understood that the lens groups can be designed to be placed all the way in front of the prisms or distributed in the prisms. For some optical systems, distributing the lens groups in the prisms loosens the tolerances of the system and reduces the manufacturing difficulty and cost.

Figure 5:
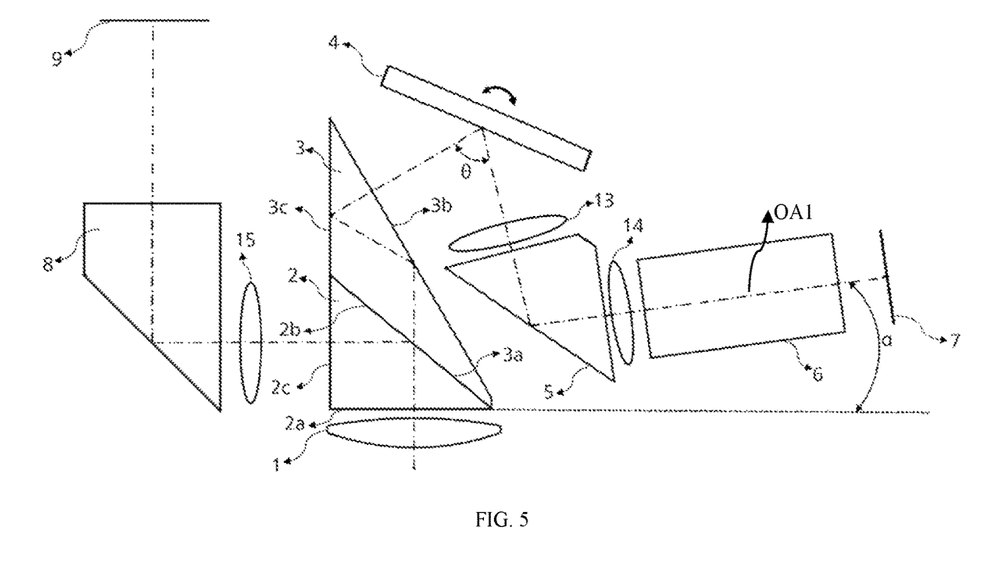
FIG. 5 is a schematic diagram of optical path in an optical system of the microscope tube of FIG. 1 with a plurality of lens groups being added.

As shown in FIG. 5, in the optical path system of the microscope tube shown in FIG. 1, the first lens group 13 and the second lens group 14 are inserted in the ocular optical path according to the optical imaging requirement, and a third lens group 15 is inserted in the camera detection optical path. Thus, in the ocular optical path, light emitted from the objective passes through the collecting lens 1 and the horizontal receiving plane 2a of the 45 degree right angle prism 2, and is incident on the slope plane 2b of the 45 degree right degree prism 2. Since the slope plane is coated with a beam splitting film, the light incident on the slope plane is split into a first light portion transmitted through the slope plane and a second light portion reflected at the slope plane, wherein the first light portion is incident on the second face 3b of the quadrilateral prism 3 through the slope plane 2b (also the first face 3a of the quadrilateral prism 3), and is reflected by the second face 3b to the third face 3c, and the third face 3c re-reflects the light to the second face 3b. The light exits through the second face 3b to the mirror 4, is reflected by the mirror 4, and passes through the first lens group 13 into the isosceles prism 5. Thereafter, the light is totally reflected inside the isosceles prism 5 and passes through the second lens group 14 to the binocular unit 6 and the human eye 7.

Due to the dispersed design of the lens groups in the ocular optical path, in order to ensure that the detection end of the camera can obtain the same image quality as the ocular optical path, it is necessary to redesign the optical path thereof by adding a lens group. Specifically, in the camera detection optical path, light emitted from the objective passes through the collecting lens 1 and the receiving plane 2a of the 45 degree right angle prism 2 and is incident on the slant plane 2b of the 45 degree right angle prism 2, wherein a second light portion reflected at the slant plane 2b is reflected to the exit plane 2c. The light then passes through the third lens group 15 to the 45 degree right angle trapezoidal prism 8, and finally to the detect imaging plane 9 with one total reflection inside the 45 degree right angle trapezoidal prism 8.

It will be appreciated that the collecting lens 1, the first lens group 13, the second lens group 14, and the third lens group 15 mentioned above may be a single-piece lens, a bonding lens, or a combination of lenses, and that the position of the lens groups in the optical path may be changed according to the actual optical requirements, and the number of lenses may be increased or decreased as appropriate. In the prior art, in order to achieve the requirements of reversed image of the microscope, when a secondary imaging system (i.e., when the system images not only at the final output end but also images in the optical path) is adopted, the optical path system must contain a roof prism or a mirror, and 0 or even number of reflections are required. Since the imaging system with two imaging planes (i.e., secondary imaging system) is more cumbersome, there are more optical elements than the imaging system with only one imaging plane, thus resulting in a bulkier system. In addition, since the roof prism used in the secondary imaging system is difficult to manufacture, it results in a higher production cost. For this reason, all embodiments of the disclosure described above use the system with only one imaging plane to avoid the disadvantages and drawbacks of the secondary imaging by a reasonable optical design (such that the system images only at the final output end and an even number of reflections are included).

It should be noted that the above-described embodiments are illustrative only, and that the present disclosure is not limited to these embodiments. A person skilled in the art can make various changes and modifications without departing from the scope or spirit of the disclosure in view of the disclosure herein. The true scope of the disclosure is defined by the appended claims and equivalents thereof.

The following are example embodiments in accordance with the disclosure:

1. A microscope tube including a ocular optical path including a collecting lens (1), a deflecting optical system, a binocular unit (6) and an eyepiece, wherein light emitted from an objective enters through the collecting lens (1) and is transmitted into the binocular unit (6) via the deflecting optical system to allow a human eye (7) to observe by the eyepiece at a visual angle, which is determined as an angle of an optical path axis (OAI) in the binocular unit (6) with respect to a horizontal line;

characterized in that the deflecting optical system includes a fixed deflecting optical components group and a rotatable deflecting optical components group located after the fixed deflecting optical components group along a light transmission path, the visual angle being adjustable by the rotatable deflecting optical components group; the light emitted from the objective reaching the binocular unit (6) after an even number of reflections of at least four times by the deflecting optical system, including successively at least a first reflection and a second reflection occurring in the fixed deflecting optical components group, and a third reflection and a fourth reflection occurring in the rotatable deflecting optical components group; wherein the third reflection point is the highest in a vertical direction as compared to the first reflection point, the second reflection point and the fourth reflection point.

2. The microscope tube according to 1, characterized in that the fourth reflection point is the lowest in the vertical direction as compared to the first reflection point, the second reflection point and the third reflection point.

3. The microscope tube according to 1 or 2, characterized in that said rotatable deflecting optical components group includes a rotatable mirror and/or a rotatable prism.

4. The microscope tube according to 1 or 2, characterized in that said rotatable deflecting optical components group includes a rotatable mirror and a prism fixed in position and angle with respect to the light reflected by said mirror.

5. The microscope tube according to 1 or 2, characterized in that said rotatable deflecting optical components group includes a rotatable mirror and another mirror fixed in position.

6. The microscope tube according to any one of 3 to 5, characterized in that the variation of the visual angle is twice the rotation angle of the rotatable mirror, that is, if the rotatable mirror is rotated by an angle a, the variation of the visual angle is 2a.

7. The microscope tube according to any one of 1 to 6, characterized in that the minimum angle of the visual angle is less than 0°.
8. The microscope tube according to 7, characterized in that it further includes a camera detection optical path including a detect imaging plane (9).
9. The microscope tube according to 8, characterized in that the light emitted from the objective reaches the detect imaging plane (9) after an even number of reflections of at least two times by the deflecting optical system.
10. The microscope tube according to any of 1 to 9, characterized in that the at least four reflections occurring in the ocular optical path include at least two total reflections.
11. The microscope tube according to any one of 1 to 10, characterized in that a first lens group (13) and a second lens group (14), each of which is a single-piece lens, or a bonding lens, or a combination of lenses, are inserted in the ocular optical path.
12. The microscope tube according to 8 or 9, characterized in that a third lens group (15), which is a single-piece lens, or a bonding lens, or a combination of lenses, is inserted in the camera detection optical path.
13. The microscope tube according to 8 or 9, characterized in that the fixed deflecting optical components group includes a 45 degree right angle prism (2) and a polygonal prism, which are bonded to each other at a slant plane (2b) of the 45 degree right angle prism (2).
14. The microscope tube according to 13, characterized in that the polygonal prism is a prism enabling two times of total internal reflection.
15. The microscope tube according to 14, characterized in that the polygonal prism is a triangular prism or a quadrilateral prism (3).
16. The microscope tube according to any one of 13 to 15, characterized in that the slant face (2b) of the 45 degree right angle prism (2) is coated with a beam splitting film, so that the light passing through a horizontal receiving plane (2a) of the 45 degree right angle prism and incident on the slant plane (2b) is split into a first light portion transmitted through the slant plane (2b) and a second light portion reflected at the slant plane (2b), wherein the first light portion is emitted to the rotatable deflecting optical components group after two reflections at two reflecting planes of the polygonal prism, and enters into the binocular unit (6) after two reflections at the rotatable deflecting optical components group.
17. The microscope tube according to any of 13 to 16, characterized in that the camera detection optical path includes a plane mirror or a prism enabling one total internal reflection, and the second light portion reaches the detect imaging plane (9) after one reflection at the plane mirror or the prism enabling one total internal reflection.
18. The microscope tube according to 17, characterized in that the prism enabling one total internal reflection is a 45 degree right angle trapezoidal prism (8).
19. The microscope tube according to 8 or 9, characterized in that the fixed deflecting optical components group includes a 45 degree rhombic prism (10) and a polygonal prism, which are bonded to each other at a first slant plane (10b) of the 45 degree rhombic prism (10).
20. The microscope tube according to 19, characterized in that the polygonal prism is a prism enabling two times of total internal reflection.
21. The microscope tube according to 20, characterized in that the polygonal prism is a triangular prism or a quadrilateral prism (3).
22. The microscope tube according to any one of 19 to 21, characterized in that a first slant plane (10b) of the 45 degree rhombic prism is coated with a beam splitting film, so that light passing through a horizontal receiving plane (10a) of the 45 degree rhombic prism and incident on the first slant plane is split into a first light portion transmitted through the first slant plane (10b) and a second light portion reflected at the first slant plane (10b), wherein the first light portion is emitted to the rotatable deflecting optical components group after two reflections at two reflecting planes of the polygonal prism, and enters into the binocular unit (6) after two reflections at the rotatable deflecting optical components group.
23. The microscope tube according to 22, characterized in that said second light portion reaches said detect imaging plane (9) after one reflection at a second slant plane (10c) of the 45 degree rhombic prism (10), which is parallel to and opposite to the first slant plane (10b).
24. The microscope tube according to any of 1 to 9, characterized in that said fixed deflecting optical components group includes a prism enabling an even number of total internal reflection of at least two times.
25. The microscope tube according to 24, characterized in that the prism enabling an even number of total internal reflection of at least two times has a smallest, first acute angle between 30° and 45°, and a second acute angle that is twice the smallest first acute angle.
26. The microscope tube according to 25, characterized in that the prism enabling an even number of total internal reflection of at least two times is a 30 degree right angle prism (11).
27. The microscope tube according to 26, characterized in that said 30 degree right angle prism (11) is arranged such that its short straight or slant side faces said collecting lens (1) to serve as a horizontal receiving plane for light transmitted through said collecting lens (1).

What is claimed is:

1. A microscope tube comprising a ocular optical path including a collecting lens, a deflecting optical system, a binocular unit, and an eyepiece, wherein light emitted from an objective enters through the collecting lens and is transmitted into the binocular unit via the deflecting optical system to allow a human eye to observe by the eyepiece at a visual angle, which is determined as an angle of an optical path axis in the binocular unit with respect to a horizontal line;
wherein the deflecting optical system comprises a fixed deflecting optical components group and a rotatable deflecting optical components group located after the fixed deflecting optical components group along a light transmission path, the visual angle adjustable by the rotatable deflecting optical components group, wherein the light emitted from the objective reaching the binocular unit after an even number of reflections of at least four times by the deflecting optical system, including successively at least a first reflection and a second reflection occurring in the fixed deflecting optical components group, and a third reflection and a fourth reflection occurring in the rotatable deflecting optical components group, and wherein the third reflection point is the highest in a vertical direction as compared to the first reflection point, the second reflection point, and the fourth reflection point.

2. The microscope tube according to claim 1, wherein the fourth reflection point is the lowest in the vertical direction as compared to the first reflection point, the second reflection point, and the third reflection point.

3. The microscope tube according to claim 1, wherein the rotatable deflecting optical components group comprises a rotatable mirror and/or a rotatable prism.

4. The microscope tube according to claim 1, wherein the rotatable deflecting optical components group comprises a rotatable mirror and a prism fixed in position and angle with respect to the light reflected by the mirror.

5. The microscope tube according to claim 1, wherein the rotatable deflecting optical components group comprises a rotatable mirror and another mirror fixed in position.

6. The microscope tube according to claim 3, wherein the variation of the visual angle is twice the rotation angle of the rotatable mirror, that is, if the rotatable mirror is rotated by an angle a, the variation of the visual angle is 2a.

7. The microscope tube according to claim 1, wherein the minimum angle of the visual angle is less than 0°.

8. The microscope tube according to claim 7, wherein the microscope tube further comprises a camera detection optical path including a detect imaging plane.

9. The microscope tube according to claim 8, wherein the light emitted from the objective reaches the detect imaging plane after an even number of reflections of at least two times by the deflecting optical system.

10. The microscope tube according to claim 1, wherein the at least four reflections occurring in the ocular optical path include at least two total reflections.

11. The microscope tube according to claim 1, wherein a first lens group and a second lens group, each of which is a single-piece lens, or a bonding lens, or a combination of lenses, are inserted in the ocular optical path.

12. The microscope tube according to claim 8, wherein a third lens group, which is a single-piece lens, or a bonding lens, or a combination of lenses, is inserted in the camera detection optical path.

13. The microscope tube according to claim 8, wherein the fixed deflecting optical components group comprises a 45 degree right angle prism and a polygonal prism, which are bonded to each other at a slant plane of the 45 degree right angle prism.

14. The microscope tube according to claim 13, wherein the polygonal prism is a prism enabling two times of total internal reflection.

15. The microscope tube according to claim 14, wherein the polygonal prism is a triangular prism or a quadrilateral prism.

16. The microscope tube according to claim 13, wherein the slant face of the 45 degree right angle prism is coated with a beam splitting film, so that the light passing through a horizontal receiving plane of the 45 degree right angle prism and incident on the slant plane is split into a first light portion transmitted through the slant plane and a second light portion reflected at the slant plane, wherein the first light portion is emitted to the rotatable deflecting optical components group after two reflections at two reflecting planes of the polygonal prism, and enters into the binocular unit after two reflections at the rotatable deflecting optical components group.

17. The microscope tube according to claim 13, wherein the camera detection optical path includes a plane mirror or a prism enabling one total internal reflection, and wherein the second light portion reaches the detect imaging plane after one reflection at the plane mirror or the prism enabling one total internal reflection.

18. The microscope tube according to claim 17, wherein the prism enabling one total internal reflection is a 45 degree right angle trapezoidal prism.

19. The microscope tube according to claim 8, wherein the fixed deflecting optical components group comprises a 45 degree rhombic prism and a polygonal prism, which are bonded to each other at a first slant plane of the 45 degree rhombic prism.

20. The microscope tube according to claim 19, wherein the polygonal prism is a prism enabling two times of total internal reflection.

21. The microscope tube according to claim 20, wherein the polygonal prism is a triangular prism or a quadrilateral prism.

22. The microscope tube according to claim 19, wherein a first slant plane of the 45 degree rhombic prism is coated with a beam splitting film, so that light passing through a horizontal receiving plane of the 45 degree rhombic prism and incident on the first slant plane is split into a first light portion transmitted through the first slant plane and a second light portion reflected at the first slant plane, wherein the first light portion is emitted to the rotatable deflecting optical components group after two reflections at two reflecting planes of the polygonal prism, and enters into the binocular unit after two reflections at the rotatable deflecting optical components group.

23. The microscope tube according to claim 22, wherein the second light portion reaches the detect imaging plane after one reflection at a second slant plane of the 45 degree rhombic prism, which is parallel to and opposite to the first slant plane.

24. The microscope tube according to claim 1, wherein the fixed deflecting optical components group comprises a prism enabling an even number of total internal reflection of at least two times.

25. The microscope tube according to claim 24, wherein the prism enabling an even number of total internal reflection of at least two times has a smallest, first acute angle between 30° and 45°, and a second acute angle that is twice the smallest first acute angle.

26. The microscope tube according to claim 25, wherein the prism enabling an even number of total internal reflection of at least two times is a 30 degree right angle prism.

27. The microscope tube according to claim 26, wherein the 30 degree right angle prism is arranged such that its short straight or slant side faces the collecting lens to serve as a horizontal receiving plane for light transmitted through the collecting lens.

* * * * *